United States Patent
Rirschl

(10) Patent No.: US 11,728,059 B2
(45) Date of Patent: Aug. 15, 2023

(54) NUCLEAR-WASTE TRANSPORT AND STORAGE CONTAINER AND METHOD OF DRYING SAME

(71) Applicant: Christoph Rirschl, Herne (DE)

(72) Inventor: Christoph Rirschl, Herne (DE)

(73) Assignee: GNS GESELLSCHAFFT FUER NUKLEAR-SERVICE mbH, Essen (DE)

( * ) Notice: Subject to any disclaimer, the term of this patent is extended or adjusted under 35 U.S.C. 154(b) by 696 days.

(21) Appl. No.: 17/019,848

(22) Filed: Sep. 14, 2020

(65) Prior Publication Data

US 2021/0098146 A1 Apr. 1, 2021

(30) Foreign Application Priority Data

Sep. 16, 2019 (EP) .................................. 19197549

(51) Int. Cl.
| | | |
|---|---|---|
| G21F 5/06 | (2006.01) |
| B01D 53/26 | (2006.01) |
| B01D 53/28 | (2006.01) |
| G21F 9/12 | (2006.01) |
| G21F 9/08 | (2006.01) |
| G21F 5/00 | (2006.01) |
| G21F 5/008 | (2006.01) |

(52) U.S. Cl.
CPC ............. *G21F 5/06* (2013.01); *B01D 53/261* (2013.01); *B01D 53/28* (2013.01); *G21F 5/008* (2013.01); *G21F 9/08* (2013.01); *G21F 9/12* (2013.01)

(58) Field of Classification Search
CPC ... G21F 5/06; G21F 5/008; G21F 9/08; G21F 9/12; B01D 53/261; B01D 53/28
USPC ......... 250/505.1, 506.1, 507.1, 515.1, 516.1, 250/517.1, 518.1, 519.1
See application file for complete search history.

(56) References Cited

U.S. PATENT DOCUMENTS

| | | | | |
|---|---|---|---|---|
| 5,304,709 A | * | 4/1994 | Babcock ................. | B01F 33/00 588/256 |
| 6,372,157 B1 | * | 4/2002 | Krill, Jr. ................. | C01B 7/191 250/515.1 |
| 2006/0222574 A1 | * | 10/2006 | Kaye ........................ | B09B 3/40 422/184.1 |
| 2011/0065854 A1 | * | 3/2011 | Mohamed ............. | C04B 18/162 422/139 |

* cited by examiner

*Primary Examiner* — Nicole M Ippolito
(74) *Attorney, Agent, or Firm* — Andrew Wilford

(57) ABSTRACT

A transport or storage container holding radioactive waste and a body of water is dried by the steps of first draining or pumping out the body of water and thereby leaving residual water in the container. Then at least one solid drying agent is introduced into an interior the container for removing from the interior of the container for removing the physically or chemically bonded residual water. The solid drying agent is an alkaline earth salt, particularly an alkaline earth oxide.

14 Claims, 1 Drawing Sheet

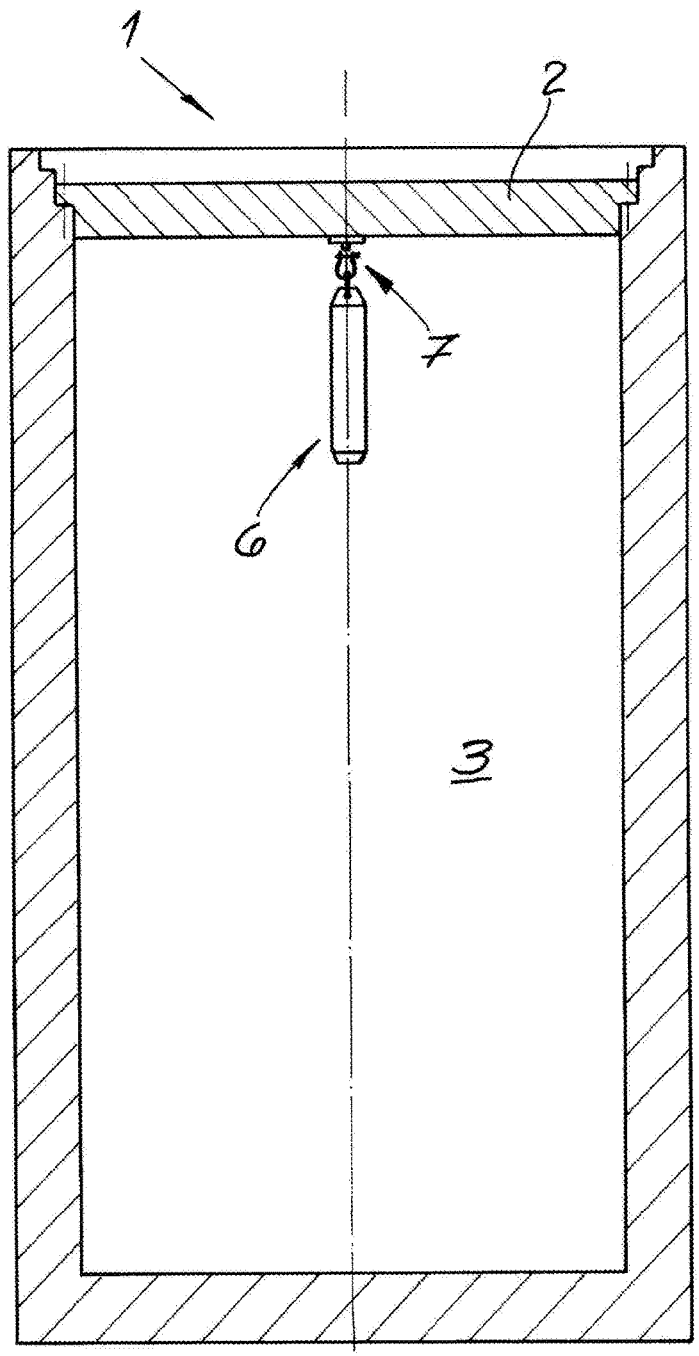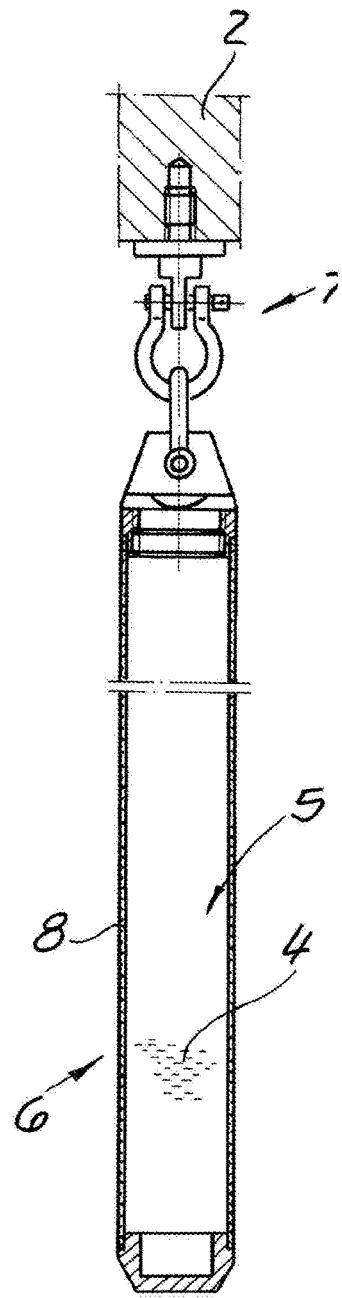

NUCLEAR-WASTE TRANSPORT AND STORAGE CONTAINER AND METHOD OF DRYING SAME

FIELD OF THE INVENTION

The present invention relates to a nuclear-waste transport and storage container. More particularly this invention concerns a method of drying such a container.

BACKGROUND OF THE INVENTION

Standard practices is to load such a container, while underwater to control radiation, with a basket filled with spent nuclear fuel rods. Then, after lifting the thus filled container out of the holding pool, it drained or pumped out. The residual water still remaining in the container is then removed from the container by drying, particularly by vacuum drying. As a rule, it is difficult to remove all the residual water from the container. Different drying measures are known for this purpose, but they are usually elaborate and, in this respect, also expensive. In addition, these drying measures are characterized by insufficient drying efficiency.

OBJECTS OF THE INVENTION

It is therefore an object of the present invention to provide an improved nuclear-waste transport and storage container and method of drying same.

Another object is the provision of such an improved nuclear-waste transport and storage container and method of drying same that overcomes the above-given disadvantages, in particular with which residual amounts of water can also be removed from the container without a problem, and that is characterized at the same time by simplicity, low expenditure, and high drying efficiency. The object of the invention is also to provide a corresponding transport and/or storage container.

SUMMARY OF THE INVENTION

A transport or storage container holding radioactive waste and a body of water is dried by the steps of first draining or pumping out the body of water and thereby leaving residual water in the container. Then at least one solid drying agent is introduced into an interior the container for removing from the interior of the container for removing the physically or chemically bonded residual water. The solid drying agent is an alkaline earth salt, particularly an alkaline earth oxide.

It is within the scope of the invention that the solid drying agent is calcium oxide, or that at least 80 wt %, preferably at least 85 wt %, particularly at least 90 wt % and particularly preferably at least 95 wt % of the solid drying agent is calcium oxide. It is recommended that the drying agent consists entirely or essentially entirely of calcium oxide. Powdery calcium oxide is expediently used as the drying agent. It is within the scope of the invention that the calcium oxide has a bulk density of 800 to 1200 kg/m³ at 20° C.

The method according to the invention is preferably used for the drying of transport and/or storage containers holding spent fuel elements. The method is particularly suitable for containers with higher or high thermal outputs. Expediently, the thermal output of the container lies between 12.5 kW and 42 kW, particularly between 15 kW and 40 kW, and preferably between 20 kW and 40 kW, for example, between 25 kW and 40 kW. According to one embodiment, the container has a thermal output of up to 39 kW. In this context, the method according to the invention has proven to be particularly useful.

It is within the scope of the invention that the container is loaded under water, particularly is loaded with spent fuel elements under water, and that, within the scope of the method according to the invention, the container is first drained or pumped out. It is recommended that, after draining or after the pumping out of the interior of the container, the interior of the container is first vacuum-dried and that the residual water is only subsequently removed from the interior of the container with the drying agent according to the invention. According to a recommended design variation of the invention, the interior of the container is filled with helium gas after vacuum drying. It has proven effective if the interior of the container is filled with helium gas up to an internal pressure of 400 hPa to 1000 hPa, preferably from 600 hPa to 1000 hPa, and particularly from 750 hPa to 950 hPa.

It is within the scope of the invention that the drying agent or the calcium oxide is introduced into the interior of the container after vacuum drying. A particularly preferred embodiment, which is of particular importance within the scope of the invention, is characterized in that the drying agent or the calcium oxide is introduced into the interior of the container as at least one candle, and that the drying is carried out with the filter candle in the closed container. For this purpose, the filter candle preferably extends in the longitudinal direction of the interior of the container. According to one design variation, the filter candle can extend over the entire height or length of the interior of the container. According to another preferred embodiment, the filter candle extends only over part of the length or height of the interior of the container.

A recommended embodiment of the method according to the invention is characterized in that the drying agent or the calcium oxide and preferably the filter candle with the drying agent or with the calcium oxide is introduced into the upper third of the interior of the container, particularly in the upper quarter of the interior of the container. According to a particularly preferred design variation of the method according to the invention, the installation location is in the upper fifth of the interior of the container. In this case, the term "upper" refers to the erect state of the container with the lid or primary lid up.

For further attaining the inventive objects, the invention also teaches a transport and/or storage container for radioactive waste, particularly for spent fuel elements, where at least one drying device with at least one drying agent is provided in the container for removing residual water content after pumping out and after vacuum drying of the interior of the container, and where the drying agent is an alkaline earth salt, particularly an alkaline earth oxide, and particularly preferably calcium oxide. Expediently, the calcium oxide is present in the interior of the container or in the drying device in powder form.

A particularly preferred embodiment of the container according to the invention is characterized in that the drying agent or the calcium oxide is accommodated in at least one, particularly in one, filter candle. The filter candle is preferably securely fastened, for example, suspended, in the upper third, particularly in the upper quarter, and particularly preferably in the upper fifth of the interior of the container. As already described, the upper third or upper quarter and upper fifth relates to the upright state of the container with the lid or primary lid uppermost. It is within the scope of the invention that the length of the filter candle extends over the upper fifth or approximately over the upper fifth of the carrying basket in the interior of the container. Such a carrying basket is used, as usual, to hold spent fuel elements. It is recommended that the filter candle, including at least one hanger, has a length from 800 to 1200 mm, particularly from 900 to 1100 mm.

It is within the scope of the invention that the filter candle has a chamber for the drying agent, particularly for the calcium oxide that is delimited by walls that are permeable to water vapor. The walls permeable to water vapor of the filter candle are expediently made of a sintered metal or essentially made of a sintered metal. In this case, the sintered metal is, for example, austenitic stainless steel. It is recommended that the walls permeable to water vapor of the filter candle or the walls made of sintered metal have a pore size of 1 to 15 µm, particularly 2 to 12 µm, and preferably 4 to 12 µm. The wall thickness of the walls permeable to water vapor of the filter candle or the walls made of sintered metal is expediently 0.5 to 6 mm, particularly 1 to 5 mm and preferably 1.5 to 3 mm. The outside diameter of the filter candle measured in the horizontal direction in the securely fastened state of the filter candle is preferably 25 to 60 mm, particularly 30 to 50 mm, and, for example, 35 to 45 mm. According to an advantageous embodiment of the invention, the loading volume of the filter candle is 600 to 1200 ml, particularly 700 to 1100 ml, and preferably 800 to 1000 ml.

It is within the scope of the invention that the container is closed by a primary lid. Expediently, the filter candle is securely hung from the underside of the primary lid.

The free volume of the interior of the container of a transport and/or storage container according to the invention is preferably 2 to 8 m³, particularly 3 to 6 m³. In this case, free volume of the container refers particularly to the interior volume of the container without a carrying basket and without fuel elements. It has proven to be successful if 700 to 1200 g of drying agent, and particularly 700 to 900 g of drying agent or calcium oxide, are used to remove the residual amount of water from a container or particularly from a container with the aforementioned free volume. A filter candle introduced into the container expediently holds 700 to 1200 g, particularly 700 to 900 g, of drying agent or calcium oxide. It is within the scope of the invention that the water vapor absorption capacity of a filter candle or such a filter candle is 200 to 400 g, particularly 210 to 300 g of water vapor. In order to be able to determine a sufficient degree of dryness in the interior of the container, a measurement of the pressure increase in the closed container is expediently carried out.

The invention is based on the knowledge that, with the method according to the invention and with the transport and/or storage container according to the invention, simple, inexpensive and functionally reliable and efficient drying of the interior of the container is possible. Residual amounts of water in the interior of the container can be removed almost completely without any problems and with reliable functionality. Water that is physically and chemically bonded in the container is almost completely absorbed by the drying agent or by the calcium oxide. The invention is based on the discovery that the rate of water binding of calcium oxide is sufficient to absorb the amount of water released in the container. It must be emphasized that the execution of the method according to the invention is relatively inexpensive. Especially the instrument-based expenditure for drying the interior of the container is kept within limits. Furthermore, the method according to the invention is characterized by a low susceptibility to failure. The method is particularly suitable for containers with a higher or high thermal output.

In this respect, the method according to the invention and the container according to the invention have considerable advantages over the measures known from practice.

BRIEF DESCRIPTION OF THE DRAWING

The above and other objects, features, and advantages will become more readily apparent from the following description, reference being made to the accompanying drawing in which:

FIG. 1 is a schematic side-view section through the transport and/or storage container according to the invention; and FIG. 2 is a schematic side-view section through a filter candle for the method according to the invention or for the container according to the invention.

SPECIFIC DESCRIPTION OF THE INVENTION

As seen in FIG.

FIG. 1 shows a transport and/or storage container 1 according to the invention that was loaded with a carrying basket (not showed) with spent fuel elements. The loading took place under water and the container 1 was first drained or pumped out. Expediently and here, a primary lid 2 for closing the container 1 closes the container 1. Preferably and here, the interior of the container 3 of the container 1 was first vacuum-dried.

For removing the residual water from the interior of the container 3, a solid drying agent 4 is used according to the invention that, according to a preferred embodiment, is calcium oxide in powder form. It is recommended that, also in the embodiment, this drying agent 4 or the calcium oxide in powder form is held in a chamber 5 of a filter candle 6. This filter candle 6 is shown in more detail in FIG. 2.

Preferably and here, the filter candle 6 is positioned in the upper fifth of the interior of the container 3 of the container 1. Effectively and here, the filter candle 6 is suspended from the underside of the primary lid 2 via a hanger 7. It is within the scope of the invention that the walls delimiting the chamber 5 of the filter candle 6 are permeable to water vapor. Expediently and here, these walls permeable to water vapor are made of a sintered metal. According to a design variation of the invention, this can be austenitic stainless steel. According to a preferred embodiment, the walls 8 permeable to water vapor of the filter candle 6 have a wall thickness between 1 and 5 mm and are recommended to have a pore size between 2 and 12 µm. Effectively and here, the filter candle 6, including the hanger 7, has a length of approximately 800 to 1200 mm, particularly from 900 to 1100 mm.

The free volume of the interior of the container 3 of the container 1 according to the invention is expediently 2 to 8 m³, particularly 3 to 6 m³. In this case, free volume of the container 1 refers particularly to the interior volume of the container 1 without the carrying basket and without fuel elements. The diameter or the outside diameter of the filter candle 6 corresponds to only a fraction of the inside diameter of the interior of the container 3. Expediently, the diameters are measured in the horizontal direction of the propped up container 1. According to a recommended design variation of the invention, the outer diameter of the filter candle 6 is less than one sixth and preferably less than one eighth of the inner diameter of the interior of the container 3.

I claim:

1. A transport or storage container holding radioactive waste and a body of water is dried by the steps of:

a) draining or pumping out the body of water, leaving residual water in the container; and thereafter b) introducing at least one solid drying agent consisting essentially of an alkaline earth salt into an interior the container for removing physically or chemically bonded residual water.

2. The method according to claim 1, wherein the solid drying agent is at least 80 wt % calcium oxide.

3. The method according to claim 1, further comprising, between steps a) and b), the steps of:

a') vacuum-drying an interior of the container; and, after step c), the step of:

d) removing the residual water from an interior of the container with the solid drying agent.

4. The method according to claim 3, wherein step a' is carried out after step a").

5. The method according to claim 1, further comprising the step after step a') and before step c) of:

a") filling the interior of the container with helium gas after vacuum drying.

6. The method according to claim 5, wherein the interior of the container is filled with helium gas up to an internal pressure of 400 hPa to 1000 hPa.

7. The method according to claim 1, wherein the drying agent or the calcium oxide is introduced into the interior of the container as at least one candle.

8. The method according to claim 7 wherein the candle with the drying agent is introduced into an upper third of the interior of the container.

9. A transport or storage container for radioactive spent fuel elements, the container:

a vessel constructed to hold the spent fuel elements;

a lid hermetically closing the vessel and defining therewith an interior holding the fuel elements and adapted to be vacuum dried; and a drying device comprising drying agent consisting essentially of an alkaline earth oxide.

10. The transport or storage container according to claim 9, wherein the drying agent is calcium oxide.

11. The transport or storage container according to claim 9, wherein the drying agent is powder form.

12. The transport or storage container according to claim 9 wherein the drying agent is held in a candle that is suspended in an upper third of the interior of the container.

13. The transport or storage container according to claim 12, wherein the candle has walls defining a chamber for the drying agent, the walls being made at least partially of a sintered metal and being permeable to water vapor.

14. The transport or storage container according to claim 13, wherein the walls permeable to water vapor of the filter candle have a wall thickness of 0.5 mm to 6 mm.

* * * * *